No. 744,107. PATENTED NOV. 17, 1903.
E. S. REGNIER.
SLICER.
APPLICATION FILED FEB. 10, 1900.
NO MODEL. 2 SHEETS—SHEET 1.
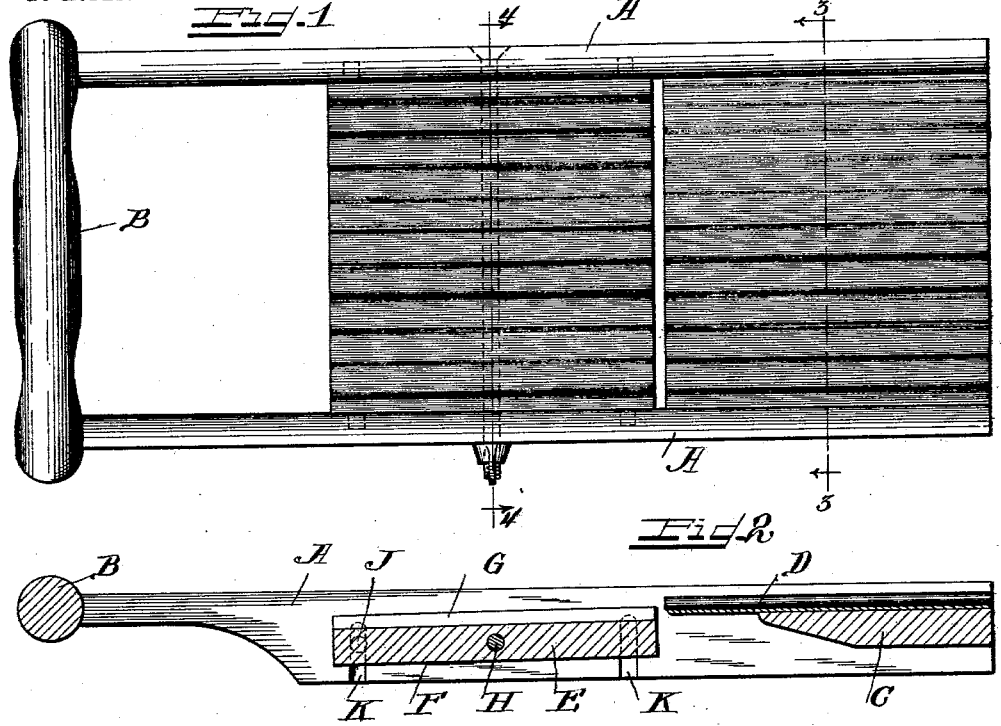
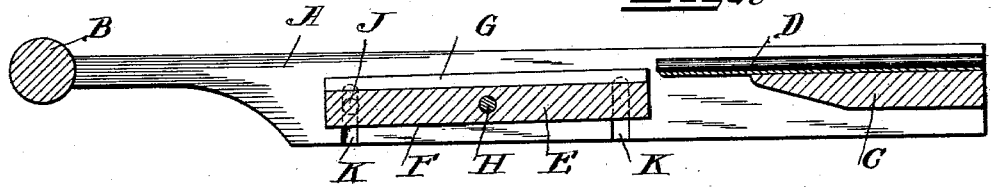
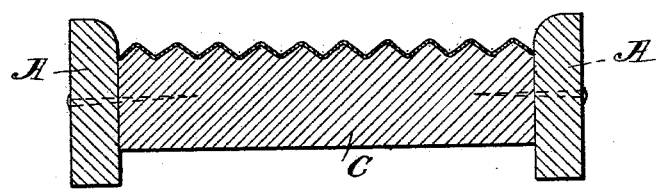
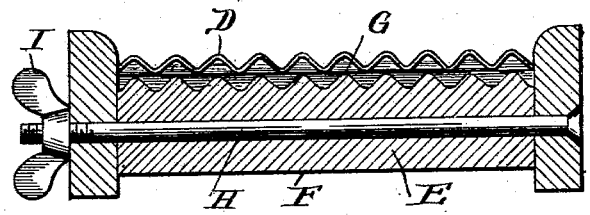

No. 744,107. PATENTED NOV. 17, 1903.
E. S. REGNIER.
SLICER.
APPLICATION FILED FEB. 10, 1900.
NO MODEL. 2 SHEETS—SHEET 2.
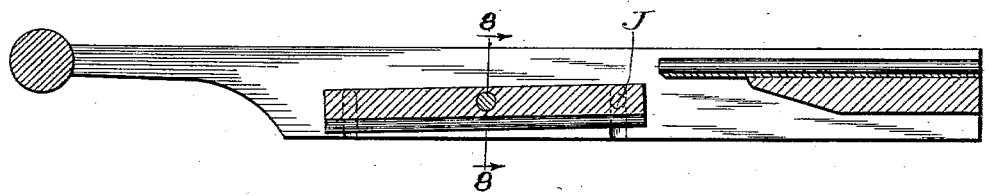
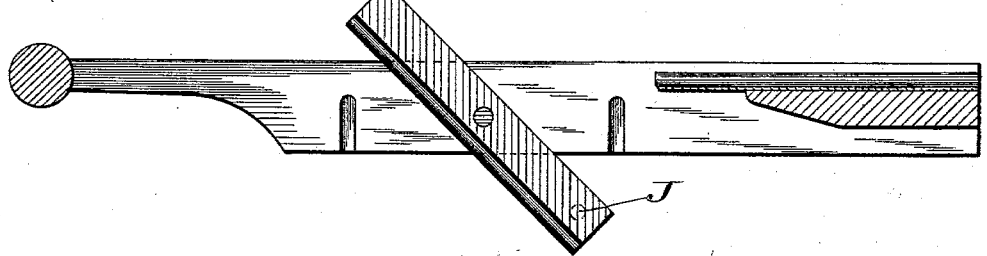
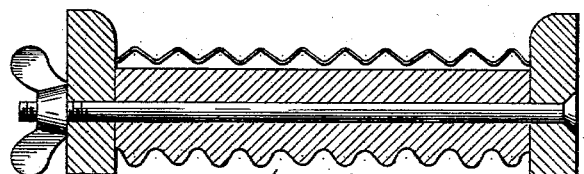
Witnesses
J B Weir
J D Perry
Inventor
E. S. Regnier
By H. W. Richards
Raymond Cushman
Attys.

No. 744,107.                                            Patented November 17, 1903.

UNITED STATES PATENT OFFICE.

EUGENE S. REGNIER, OF GALESBURG, ILLINOIS, ASSIGNOR OF ONE-HALF TO LOUISA M. RICHARDS, OF GALESBURG, ILLINOIS.

SLICER.

SPECIFICATION forming part of Letters Patent No. 744,107, dated November 17, 1903.

Application filed February 10, 1900. Serial No. 4,743. (No model.)

*To all whom it may concern:*

Be it known that I, EUGENE S. REGNIER, a citizen of the United States, residing at 235 South Whitesboro street, Galesburg, in the county of Knox and State of Illinois, have invented certain new and useful Improvements in Slicers, of which the following is a specification.

This invention relates to improvements in that class of devices especially designed for slicing vegetables, fruits, &c., such as potatoes, cucumbers, apples, and the like; but it is especially adapted for slicing potatoes into novel forms for frying or for making "Saratoga chips," whereby a new product of both domestic and commercial value is produced.

The primary object of this invention is to enable the production of a slice, whether of vegetable or fruit, that will be novel and ornamental in appearance, that will expose the maximum superficial area, whether it be intended for cooking or drying, and that will not pack or mat while cooking or drying, whereby it insures the thorough cooking or drying of each slice of a batch and the production of a product novel both in shape and appearance, as well as in characteristics.

Another object of my invention is to enable the production of either perforated or imperforate, fluted, or corrugated slices, as may be desired, at the same cost both of time and material, with no loss of the vegetable or fruit being sliced and with no more labor or skill than is involved in the production of plain slices by the slicers now commonly employed.

Another object is the ready production of corrugated or fluted imperforate slices having their opposite faces parallel or perforated slices having their opposite faces corrugated or fluted at an angle to each other, manipulating the vegetable upon the slicer in one or another of two ways, as hereinafter described.

These and such other objects as may hereinafter appear are attained by the devices illustrated in the accompanying drawings, in which—

Figure 1 is a plan view of a slicer embodying my invention in its preferred form. Fig. 2 is a central longitudinal section thereof. Fig. 3 is a transverse vertical section on the line 3 3 of Fig. 1. Fig. 4 is a view similar to Fig. 3, but taken on the line 4 4 of Fig. 1. Fig. 5 is a view similar to Fig. 2, but showing the guide-board reversed or inverted. Fig. 6 is a view similar to Fig. 5, showing the guide-board in the act of being reversed. Fig. 7 is a view similar to Fig. 2, but showing a fixed guide-board. Fig. 8 is a vertical section on the line 8 8 of Fig. 5 looking in the direction indicated by the arrows. Figs. 9 and 10 are detail diagrammatic views of different forms of cutters; and Figs. 11 and 12 are plan views of different kinds of slices, showing two different products.

Similar letters of reference indicate the same parts in the several figures of the drawings.

Referring by letter to the accompanying drawings, A indicates the side bars, and B the handle connecting the same at one end and constituting the frame of the slicer, the ends of the bars A opposite the handle being permanently connected by a rigid cutter-board C, all of the parts so far described being preferably composed of wood, because of the cheapness, lightness, and strength thereof. The upper surface of the cutter-board, however, is corrugated and has rigidly secured thereto a corrugated cutter D, which is made of sheet metal of uniform thickness throughout. The corrugations of the cutter correspond with and fit into the corrugations of the cutter-board, and preferably the cutter projects some distance beyond the front edge of the cutter-board, the latter being preferably cut away, as shown in Fig. 2, to permit the more ready escape of the slices without contact therewith.

Forward of the cutter-board is located a guide-board E, between the frame-bars A, to which said board is either rigidly or pivotally secured, the preferable construction being the pivoted construction shown in Figs. 1 to 6, inclusive. One side of this guide-board— say the side F—is a flat or plane surface, while the other side thereof, G, is corrugated or fluted to correspond with the corrugations or flutes in the cutter D, the corrugations or flutes in the guide-board being so disposed that the projected surface of the guide-board is parallel with the corrugations of the cutter considered in cross-section, as clearly illustrated in Fig. 4. It will therefore be obvious that with this corrugated working surface of the guide-board uppermost after the first or outside cut is made each slice of the vegetable or fruit will take the corrugated or fluted shape and dimensions of the space between the projected working surface of the guide-board and the under surface of the cutter, it being understood that the vegetable or fruit in the act of slicing will be held in the hand and without being turned or rotated slid back and forth upon the guide-board against and onto the cutter, and as the latter is located in a plane above the plane of the guide-board the slice as formed will pass beneath the projecting end of the cutter. This guide-board is preferably pivoted at its center of length between the side bars A by means of the bolt H, which is headed at one end of the side bars and is screw-threaded at its opposite end, which projects through and sufficiently beyond the other side bar to receive a thumb-nut I, by means of which the guide-board can be squeezed sufficiently tight between the side bars to hold it securely in any adjusted position during use. The purpose of having the guide-board pivoted is that it may be readily inverted, so as to bring uppermost either its corrugated or its plane surface. I have already stated the use of the corrugated surface of the guide-board, and it will of course be understood that by a proper adjustment of the vertical space between the opposing edge of this board and the cutter the thickness of the slice produced thereby may be adjusted and determined. The appearance of the slice in edge view as produced with the corrugated side of the guide-board up will be similar to the space between said corrugated side of the guide-board and the cutter, as seen in Fig. 4. A plan view of the slice thus produced is shown in Fig. 11. In producing this corrugated or fluted slice the corrugations formed in the lower surface of the vegetable by the cutter fit the corresponding corrugations on the guide-board, which latter thus serve to guide the vegetable in its movements back and forth over the guide-board as the vegetable is repeatedly forced against the cutter, it not being intended in this operation that the vegetable should be rotated upon an axis perpendicular to the surface of the guide-board, but that it should be always moved back and forth with the same side to the front, thus producing upon opposite sides of the slice parallel grooves and ribs, which gives to the slice a corrugated or fluted shape, with its opposite faces parallel, the slice of course being imperforate and of whatever thickness desired, its diameter being of course determined by the size of the vegetable or fruit being sliced.

To produce the perforated slice shown in Fig. 12, it is necessary to partially rotate the vegetable being sliced upon an axis perpendicular to the surface of the guide-board, so that the grooves or corrugations upon one face of the slice will extend across the same at an angle to the grooves in the other face of the slice, this partial rotation taking place after each cut. If the vegetable is turned a complete quarter, so that the corrugations on one side are exactly at a right angle to the corrugations in the other side, with a cutter having curved corrugations the perforations produced will be substantially circular, as shown in Fig. 12; but if the rotation of the vegetable be such as to form the grooves at any angle less than a right angle the perforations in the slice will be more or less elongated or elliptical, according to the degree of angularity between the corrugations on the opposite surface of the slices. The perforations in the slice are due to the fact that the grooves in each side of the slice extend beyond the median line, or, in other words, to a depth more than one-half of the distance between the crowns of the ridges on the opposite sides of the slice, and this in turn is due to the fact that the cutter and guide-board are so disposed with relation to each other that the plane of the working surface of the guide-board and a second plane touching the lowest points of the corrugations at the cutting edge of the cutter are separated by a distance which is less than the depth of the said corrugations. If they are separated by a greater space, the result will be a slice corrugated on opposite sides, but without perforations, and if they are not separated by any space the result will be strips if the plain surface of the guide-board is uppermost and the plane of its projected working surface intersects the cutting edge of the cutter. Under any other conditions there would be no product at all. Another peculiarity in the construction and relations of the cutter and guide-board is that the projected working surface of the guide-board and the under surface of the cutter are parallel or substantially parallel in any plane cutting them and parallel with the corrugations of the cutter. This relation of the parts is important where perforated slices are to be produced, because it avoids bending the slices to any considerable extent, and bending them upon the lines of their corrugations would tend to break them and would in many instances do so. Having cut one slice, if the vegetable be given a quarter-turn and presented to the cutter for making another slice the corrugations of the first cut would fall parallel with the end of the cutter, and if the under side of said cutter were at an abrupt angle to the projected working surface of the guide-board the slice would be bent upon the lines of the corrugations in its under side and in many instances thereby broken. Another feature of the cutter which tends to avoid bending the slices is the parallelism of its upper and lower surfaces due to its being made of a sheet of metal of uniform thickness throughout. To facilitate the production of these perforated slices, I prefer to use the guide-board with its plane side uppermost, as shown in Fig. 5. With this side of the guide-board uppermost when the corrugated lower face of the vegetable is brought back onto the guide-board it may be partially rotated freely in either direction thereon, because there are no corrugations on this face of the guide-board to be engaged by the corrugations on the under side of the vegetable in contact therewith, and hence it is very easy for a mere novice with the plane side of the board uppermost to produce slices having grooves at various angles and with various-shaped openings therein, and, in fact, with the ordinary working of the apparatus it would be quite difficult to produce two slices exactly alike, and, indeed, such a product is not especially desirable.

As an additional, though not essential, feature I provide a stop to limit the swinging of the guide-board upon its pivot by means of a pin J, fastened to and projecting from the side of the guide-board near one end thereof, which pin is adapted and arranged to engage grooves K, cut in the inner face of one of the side bars in proper position to receive the pin, the pin entering one of the grooves when the board is in one position and entering the other grooves when in the reversed position. When in one groove, it serves to limit the downward tilting of the board with relation to the cutter and when in the other groove it serves to limit the upward tilting of the board. I have also found in practice that the best results will be obtained by having the guide-board so disposed with relation to the cutter that its upper surface will always incline slightly upward toward the cutter in whatever position it may be adjusted for cutting slices from the maximum to the minimum thickness, as by having this angularity between the cutter and the guide-board the cutter appears to work better, the slices are produced with a more uniform thickness from the front to the rear edge thereof and appear to clear the cutter more effectually, thus reducing to the minimum the difficulty of slicing and enabling the rapid and satisfactory handling of the slicer by the merest novice.

In practice I have found that it is not absolutely essential that the guide-board should be either adjustable or reversible, but that a fixed guide-board will produce the same products as those produced with the adjustable and reversible board, but not with the same degree of ease or rapidity or accuracy when used by an unskilled person, for which reason I prefer the adjustable and reversible guide-board hereinbefore described, with which the corrugated surface of the guide-board may be employed when it is desired to produce simply corrugated imperforate slices, while the plane side of the guide-board may be used when it is desired to produce the more ornamental perforated slices.

In Fig. 7 I have shown a slicer in all respects identical with that previously described, excepting that the guide-board E is fixed with the corrugated surface uppermost. With this slicer, notwithstanding the corrugations in the guide-board, the perforated slices may be produced with a little care, because the vegetable may be turned either before or after being brought back onto the guide-board, in which event the corrugated under surface of the vegetable being cut will ride upon the tops of the corrugations of the guide-board, with the corrugations therein extending at an angle with those in the guide-board. In this use of the device the tops of the corrugations of the guide-board are the "working surface" within the meaning of this term as herein used. This slicer is much less expensive than my preferred construction and embodies my invention in its simplest form.

It will be understood, of course, that the exact shape of the corrugations either in the cutter or the guide-board is immaterial, and simply for the purpose of illustration I have shown in Figs. 8, 9, and 10 three different forms in which they may be made and which of course represent the form which the corrugated or fluted slice will take when produced thereby.

While I am aware that a corrugated sheet-metal cutter, even in a vegetable-cutter, is old, I am not aware that it has ever been proposed to employ in connection therewith a guide-board, whether fixed or adjustable, having either a plane surface or a corrugated surface and having the above-described relations to the cutting edge and under surface of the cutter. By means of a device having the parts constructed and related as above described I am enabled to produce a variety of products, one, at least, of which (see Fig. 12) is entirely new. By reason of the corrugations of the slices they will not pack or mat together, and by reason of their perforations they are especially attractive, valuable, and useful for the making of Saratoga chips, because of the thorough and prompt crisping thereof on account of the great area instantly exposed to the hot grease. Aside from this they are ornamental in appearance, and for this reason especially desirable for salads, garnishings, fancy dishes, and the like. In drying or evaporating fruit the corrugated and perforated form of slice is particularly desirable.

Having thus fully described my invention, what I claim, and desire to secure by Letters Patent, is—

1. In a slicer the combination of a cutter, having longitudinal corrugations and a guide-board, said cutter and guide-board being so disposed with relation to each other that the plane of the working surface of the guide-board and a second plane touching the lowest points of the corrugations at the cutting edge of the cutter, are separated by a distance which is less than the depth of said corrugations, substantially as described.

2. In a slicer the combination of a cutter, having longitudinal corrugations and a guide-board, having a flat working surface, said cutter and guide-board being so disposed with relation to each other that the plane of the working surface of the guide-board and a second parallel plane touching the lowest points of the corrugations at the cutting edge of the cutter, are separated by a distance which is less than the depth of said corrugations, substantially as described.

3. In a slicer the combination of a cutter, having longitudinal corrugations and having also parallel upper and lower surfaces, and a guide-board, having a flat working surface, said cutter and guide-board being so disposed that the plane of the working surface of the guide-board and a second plane parallel therewith and with the cutter and touching the lowest points of the corrugations, are separated by a distance which is less than the depth of said corrugations, substantially as described.

4. In a slicer the combination of a cutter, having longitudinal corrugations, a cutter-board on which said cutter is mounted, said cutter-board having corrugations corresponding with and fitting in the corrugations of the cutter, the end of the cutter being extended some distance beyond the cutter-board and the cutter and guide-board being so disposed with relation to each other that the plane of the working surface of the guide-board and a second parallel plane touching the lowest points of the corrugations at the cutting edge of the cutter are separated by a distance which is less than the depth of said corrugations, substantially as described.

5. In a slicer the combination of a cutter having longitudinal corrugations, an invertible guide-board disposed in operative relation thereto, said guide-board having one of its faces plain and its opposite face corrugated, and means for fixing the guide-board with either of its faces uppermost, substantially as described.

EUGENE S. REGNIER.

Witnesses:
J. F. HAMILTON,
G. P. WILLIAMS.